L. P. MASON.
ARTIFICIAL BAIT.
APPLICATION FILED NOV. 25, 1916. RENEWED JULY 6, 1918.

1,293,500.  
Patented Feb. 4, 1919.

Witness  
Thos. F. Knox.

Inventor  
Lyman P. Mason  
By Victor J. Evans  
Attorney

LYMAN P. MASON, OF CHICAGO, ILLINOIS.

ARTIFICIAL BAIT.

1,293,500.　　　Specification of Letters Patent.　　　Patented Feb. 4, 1919.

Application filed November 25, 1916, Serial No. 133,461. Renewed July 6, 1918. Serial No. 243,709.

*To all whom it may concern:*

Be it known that I, LYMAN P. MASON, a citizen of the United States, residing at Chicago, in the county of Cook and State of Illinois, have invented new and useful Improvements in Artificial Baits, of which the following is a specification.

This invention relates to certain novel and useful improvements in artificial bait.

In carrying out the present invention, it is my purpose to provide artificial bait for casting or trolling of fish, wherein the body of the bait or lure will be equipped with hooks loosely connected thereto and suitably spaced apart, and radial blades at one end thereof and acting to revolve the body as the bait is drawn through the water so that the hooks will be thrown outwardly from the body under the action of centrifugal force in order to catch the fish that approach the bait but do not "bite".

With the above and other objects in view, the invention consists in the construction, combination, and arrangement of parts hereinafter set forth and falling within the scope of the claim.

In the accompanying drawing:—

Figure 1:
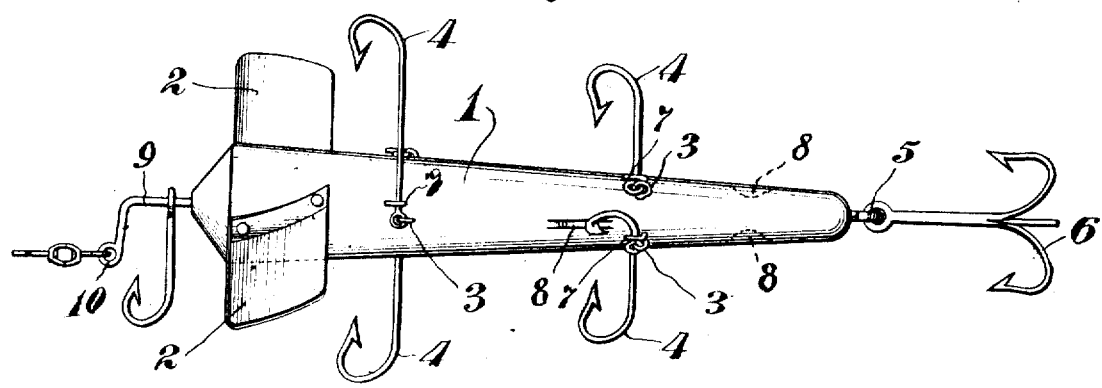
Figure 1 is a view in side elevation of an artificial bait construction.

Referring now to the drawing in detail, 1 designates the body of the bait, which is preferably circular in cross section and tapering from one end to the other. Fastened to the body 1 at one end thereof are radial blades 2 spaced apart equal distances and arranged at such an angle to the body as to revolve the latter when the bait is placed in a running stream or drawn through the water. Fastened to the body 1 are annular rows of eye screws 3 spaced apart longitudinally of the body, and the screws in each row are spaced apart equal distances around the body and preferably alternate with the screws in the adjacent row. Loosely connected to each eye screw is a fish hook 4, while connected to the end of the body remote from the blades 2 is an eye screw 5, and loosely connected to the eye screw 5 is a multiple fish hook 6.

In practice, the bait is submerged in the water, and may be drawn through the water so that the blades 2 will revolve the body 1, and in the rotation of the body 1, the hooks 4 are thrown outwardly therefrom under the action of centrifugal force, thereby catching the fish in the vicinity of the bait that do not "bite".

Figure 2:
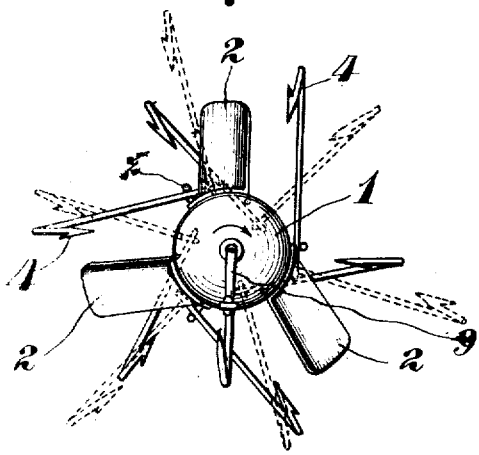
Fig. 2 is an end view of the same.

Under some circumstances, I may desire to hold the hooks 4 rigidly to the body 1 so that the hooks and the body will travel through the water as a unit. For this purpose holding hooks 7 are secured to the body 1 adjacent to the respective eyes 3, and the hooks 4 adjacent to the beveled ends are adapted to be engaged beneath the hooks 7 so that the hooks 4 will be held rigidly to the body 1 and at a tangent thereto, as clearly illustrated in Fig. 2 of the drawings. The hooks 7 are arranged in transverse alinement with their respective eye screws 3 and therefore hold the shanks of the fish hooks substantially at right angles to the medial center of the body 1 so that the gaff ends of the hooks stand at a considerable distance from the body making it easy for fish to swallow them. The body 1 is also preferably formed with grooves 8, and these grooves are adapted to receive the outer ends of the respective hooks 4, so that the hooks 4 may be held against the body whenever desired.

The end of the body that is connected to the line is provided with an axial shaft 9, and the outer end of the shaft 9 is bent at right angles to itself, as at 10, and connected with the line. By means of this construction, it will be seen that when the body is drawn through the water, such body will revolve planet fashion.

While I have herein shown and described the preferred forms of my invention by way of illustration, I wish it to be understood that I do not limit or confine myself to the precise details of construction herein described and delineated, as modification and variation may be made within the scope of the claim and without departing from the spirit of the invention.

I claim:—

An artificial bait comprising a body, means for revolving said body in the water, fish hooks pivotally connected to said body, and holding hooks arranged on the body in transverse alinement with the attached end of the fish hooks for removable engagement with the fish hook shanks to hold said shanks at substantially right angles to the medial line of the body with the gaff end thereof spaced a considerable distance from the body, said body having grooves disposed about its surface for the reception of said fish hooks.

In testimony whereof I affix my signature.

LYMAN P. MASON.